US010984962B2

(12) United States Patent
Ha et al.

(10) Patent No.: US 10,984,962 B2
(45) Date of Patent: Apr. 20, 2021

(54) SENSOR AND SUPERCAPACITOR BASED ON GRAPHENE POLYPYRROLE 3D POROUS STRUCTURE, AND INTEGRATED DEVICE INCLUDING THE SAME

(71) Applicant: Korea University Research and Business Foundation, Seoul (KR)

(72) Inventors: Jeongsook Ha, Seoul (KR); Heun Park, Seoul (KR); Jungwook Kim, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 293 days.

(21) Appl. No.: 16/255,897

(22) Filed: Jan. 24, 2019

(65) Prior Publication Data
US 2019/0228918 A1 Jul. 25, 2019

(30) Foreign Application Priority Data
Jan. 25, 2018 (KR) .................. 10-2018-0009566

(51) Int. Cl.
*H01G 11/30* (2013.01)
*H01G 11/08* (2013.01)
(Continued)

(52) U.S. Cl.
CPC .......... *H01G 11/08* (2013.01); *G01L 19/0061* (2013.01); *G01L 19/0092* (2013.01);
(Continued)

(58) Field of Classification Search
CPC . Y10S 977/843; Y10S 977/734; H01G 11/08; H01G 11/30; H01G 11/24;
(Continued)

(56) References Cited

U.S. PATENT DOCUMENTS

2017/0237075 A1  8/2017  Pedròs et al.
2019/0237269 A1*  8/2019  Fan ................... H01G 11/08

FOREIGN PATENT DOCUMENTS

JP  6256369 B2  1/2018
KR  10-1406085 B1  6/2014
(Continued)

OTHER PUBLICATIONS

Zhang, Fengjiao, et al., "Flexible and self-powered temperature—pressure dual-parameter sensors using microstructure-frame-supported organic thermoelectric materials," *Nature communications* 6, Sep. 21, 2015 (10 pages in English).
(Continued)

*Primary Examiner* — Tarun Sinha
(74) *Attorney, Agent, or Firm* — NSIP Law (57) ABSTRACT

Disclosed is a sensor based on a graphene polypyrrole 3-dimensional (3D) porous structure, the sensor comprising: the graphene polypyrrole 3D porous structure, wherein the graphene polypyrrole 3D porous structure is prepared by growing graphene on a nickel 3D porous structure, growing polypyrrole on a graphene-grown nickel 3D porous structure, and then coating polydimethylsiloxane (PDMS) on a graphene polypyrrole grown structure; and electrodes respectively disposed on top and bottom faces of the graphene polypyrrole 3D porous structure.

9 Claims, 11 Drawing Sheets

(51) Int. Cl.
*H01G 11/32* (2013.01)
*H01G 11/24* (2013.01)
*G01L 19/00* (2006.01)
*H01G 11/58* (2013.01)
*H01G 11/86* (2013.01)

(52) U.S. Cl.
CPC ............. *H01G 11/24* (2013.01); *H01G 11/30* (2013.01); *H01G 11/32* (2013.01); *H01G 11/58* (2013.01); *H01G 11/86* (2013.01)

(58) Field of Classification Search
CPC ........ H01G 11/32; H01G 11/58; H01G 11/86; H01G 11/56; G01L 1/142
See application file for complete search history.

(56) References Cited

FOREIGN PATENT DOCUMENTS

| KR | 10-1554543 | B1 | 9/2015 |
|---|---|---|---|
| KR | 10-2016-0031760 | A | 3/2016 |
| KR | 10-1813074 | B1 | 12/2017 |
| WO | WO 2017/139938 | A1 | 8/2017 |

OTHER PUBLICATIONS

Chabi, Sakineh, et al., "Three dimensional (3D) flexible graphene foam/poiypyrrole composite: towards highly efficient supercapacitors," *Rsc Advances*, Issue 6, 2015, (pp. 3999-4008).

Wang, Chunhui, et al., "Multifunctional, Highly Flexible, Free-Standing 3D Polypyrrole Foam." *Small*, 12, No. 30, Jun. 30, 2016 (pp. 4070-4076).

Park, Heun et al., Stretchable and Transparent Strain Sensor Integrated with Color-Changing Flexible Electrochromic Device, *European Materials Research Society*, 2017 (1 page in English).

Park, Heun et al., "Fabrication of Multi-functional sensor and super capacitor based on graphene/polypyrole hybrid foam", *2017 Korean Journal of Chemical Engineering Autumn Conference*, Oct. 26, 2017 (1 pages in English and 26 pages in Korean).

* cited by examiner

SENSOR AND SUPERCAPACITOR BASED ON GRAPHENE POLYPYRROLE 3D POROUS STRUCTURE, AND INTEGRATED DEVICE INCLUDING THE SAME

CROSS-REFERENCE TO RELATED APPLICATIONS

A claim for priority under 35 U.S.C. § 119 is made to Korean Patent Application No. 10-2018-0009566 filed on Jan. 25, 2018, in the Korean Intellectual Property Office, the entire contents of which are hereby incorporated by reference.

BACKGROUND

Embodiments of the inventive concepts described herein relate to a sensor and a supercapacitor based on a graphene polypyrrole 3D porous structure, and an integrated device including the same.

Recently, interest and research for a realization of artificial electronic skin that may be applied to a skin by being bent or stretched have been increased rapidly.

Accordingly, a research has been conducted on a material, an important source of detection of this artificial electronic skin, that may detect changes in pressure, heat, and strain applied from the outside.

Research on the material and research on space and weight efficiency, which is important due to characteristics of a wearable device to be attached and carried on the skin have been conducted actively.

Related literature: Korean Patent Registration No. 10-1554543

SUMMARY

Embodiments of the inventive concepts provide a sensor and a supercapacitor based on a graphene polypyrrole 3D porous structure, and an integrated device including the same capable of simultaneously detecting external stimuli such as a pressure, a temperature, and a strain, like a real skin.

Embodiments of the inventive concepts provide a sensor and a supercapacitor based on a graphene polypyrrole 3D porous structure, and an integrated device including the same capable of manufacturing a multi-sensor and a strain sensor for detecting various external stimuli, and a high-performance energy storage device by synthesizing one material.

Embodiments of the inventive concepts provide a sensor and a supercapacitor based on a graphene polypyrrole 3D porous structure, and an integrated device including the same capable of being attached to various parts of human body.

According to an exemplary embodiment, a sensor based on a graphene polypyrrole 3D porous structure includes the graphene polypyrrole 3D porous structure, wherein the graphene polypyrrole 3D porous structure is prepared by growing graphene on a nickel 3D porous structure, growing polypyrrole on the graphene-grown nickel 3D porous structure, and then coating polydimethylsiloxane (PDMS) on the graphene polypyrrole grown structure, and electrodes respectively disposed on top and bottom faces of the graphene polypyrrole 3D porous structure.

According to an exemplary embodiment, a supercapacitor based on a graphene polypyrrole 3D porous structure includes first and second graphene polypyrrole 3D porous structures, wherein each of the first and second graphene polypyrrole 3D porous structures is prepared by growing graphene on a nickel 3D porous structure, growing polypyrrole on the graphene-grown nickel 3D porous structure, and then coating polydimethylsiloxane (PDMS) on the graphene polypyrrole grown structure, and first and second electrolytes respectively applied on single faces of the first and second graphene polypyrrole 3D porous structures, wherein the first and second graphene polypyrrole 3D porous structures are arranged such that the first and second electrolytes contact each other.

According to an exemplary embodiment, the coating of the polydimethylsiloxane (PDMS) includes mixing ethyl acetate, PDMS base, and PDMS curing agent at a weight ratio of 100:10:1 to form a mixture, and immersing the graphene polypyrrole grown structure in the mixture.

According to an exemplary embodiment, each of the electrodes includes a polyethylene terephthalate (PET) indium tin oxide (ITO) film, wherein each of silver paste layers is interposed between each PET ITO film and each of the top and bottom faces of the graphene polypyrrole 3D structure.

According to an exemplary embodiment, the PDMS-coated graphene polypyrrole grown structure is washed with deionized (DI) water, is immersed in $FeCl_3$ solution and is heated to remove nickel from the structure.

According to an exemplary embodiment, the growing of the graphene on the nickel 3D porous structure includes chemical vapor depositing (CVD) the graphene on the nickel 3D porous structure while a thickness of the deposited graphene is controlled via an adjustment of a predetermined methane gas injection time.

According to an exemplary embodiment, each of the electrolytes is prepared by mixing acetonitrile, propylene carbonate, poly methyl methacrylate, and $LiClO_4$ at a mass ratio of 70:20:7:3.

According to an exemplary embodiment, an integrated device includes the sensor, the supercapacitor, and a liquid metal for electrically connecting the sensor and the supercapacitor with each other.

According to an exemplary embodiment, the sensor includes at least two sensors based on the graphene polypyrrole 3D porous structure, and wherein at least one of the at least two sensors is configured as a pressure sensor for measuring a pressure, and at least another sensor of the at least two sensors is configured as a temperature sensor for measuring a temperature.

According to an exemplary embodiment, the liquid metal electrically connects the sensor and the supercapacitor via a liquid metal patterning using a mask including a hydrophobic paper.

A sensor and a supercapacitor based on a graphene polypyrrole 3D porous structure, and an integrated device including the same according to the inventive concept have an effect that both high-performance driving element and energy storage device using a single material may be manufactured.

In addition, a sensor and a supercapacitor based on a graphene polypyrrole 3D porous structure, and an integrated device including the same according to the inventive concept have an effect that the manufactured sensor may be driven by itself.

In addition, a sensor and a supercapacitor based on a graphene polypyrrole 3D porous structure, and an integrated device including the same according to the inventive concept have an effect of driving the sensor by integrating each of the manufactured elements on a flexible substrate that may be stretched through a liquid metal connection line, and using energy stored in the energy storage device.

In addition, a sensor and a supercapacitor based on a graphene polypyrrole 3D porous structure, and an integrated device including the same according to the inventive concept have an effect that a single wireless driving system was manufactured using the same material in a mass production manner for an industrialization, thereby reducing a material cost.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinafter, embodiments of the inventive concept will be described in more detail with reference to the accompanying drawings. The inventive concept is not limited to the embodiments disclosed below, but may be implemented in various forms. The embodiments of the inventive concept are provided to fully inform those skilled in the art to which the inventive concept pertains of the scope of the inventive concept. In the drawings, the size of some of the elements was exaggerated to emphasize a clearer description.

Figure 1:
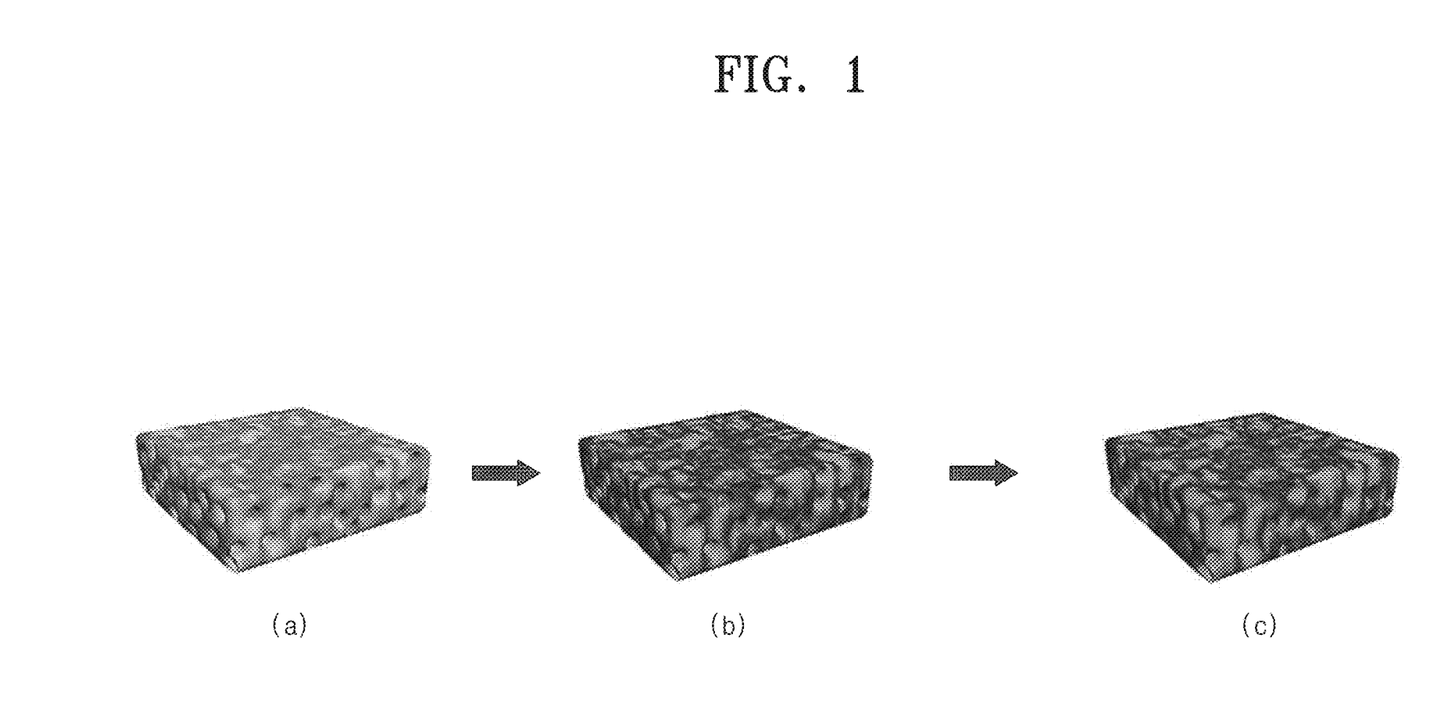
FIG. 1 is a diagram for illustrating a synthesis process of a graphene polypyrrole structure according to the inventive concept.

FIG. 1 is a diagram for illustrating a synthesis process of a graphene polypyrrole material according to the inventive concept. With reference to FIG. 1, in order to synthesize a graphene polypyrrole material, graphene was grown on a nickel 3D porous structure shown in (a) of FIG. 1 via Chemical Vapor Deposition (CVD), as shown in (b) of FIG. 1.

Specifically, the nickel 3D porous structure with a length of 4 cm, a width of 2 cm, and a thickness of 1 mm was placed in a quartz glass. Then, argon and hydrogen gas of respectively 500 sccm and 200 sccm were flowed into the nickel 3D porous structure. Then, the nickel 3D porous structure was heated to 1000° C. When a temperature reaches 1000° C., 30 sccm of methane gas is flowed into the nickel 3D porous structure for 20 minutes to grow the graphene in the nickel 3D porous structure.

Polypyrrole was electro-deposited on the nickel 3D porous structure containing the grown graphene shown in (b) of FIG. 1. Then, nickel was removed from the structure via nickel etching, and a graphene polypyrrole 3D porous structure shown in (c) of FIG. 1 was prepared.

Specifically, the polypyrrole, a conductive polymer, is electrochemically grown on the nickel 3D porous structure containing the grown graphene shown in (b) of FIG. 1

1.84 g of $NaClO_4$ and 2.5 ml of pyrrole monomer were added to a volume of 50 ml of DI water (deionized water) to form a mixture which in turn was stirred. Then, the nickel 3D porous structure containing the grown graphene shown in (b) of FIG. 1 is immersed in the mixture, and, then, the pyrrole polymer was grown in a 3-electrodes manner. At this time, a reference electrode was grown using Ag/AgCl, and a counter electrode was grown using Pt with applying a fixed voltage of 0.8 V for 500 seconds.

The manufactured graphene polypyrrole structure was washed with the DI water, was immersed in 1M $FeCl_3$, and was heated at 90° C. for about 16 hours to remove a nickel support from the structure to prepare the graphene polypyrrole 3D porous structure shown in (c) of FIG. 1.

Figure 2:
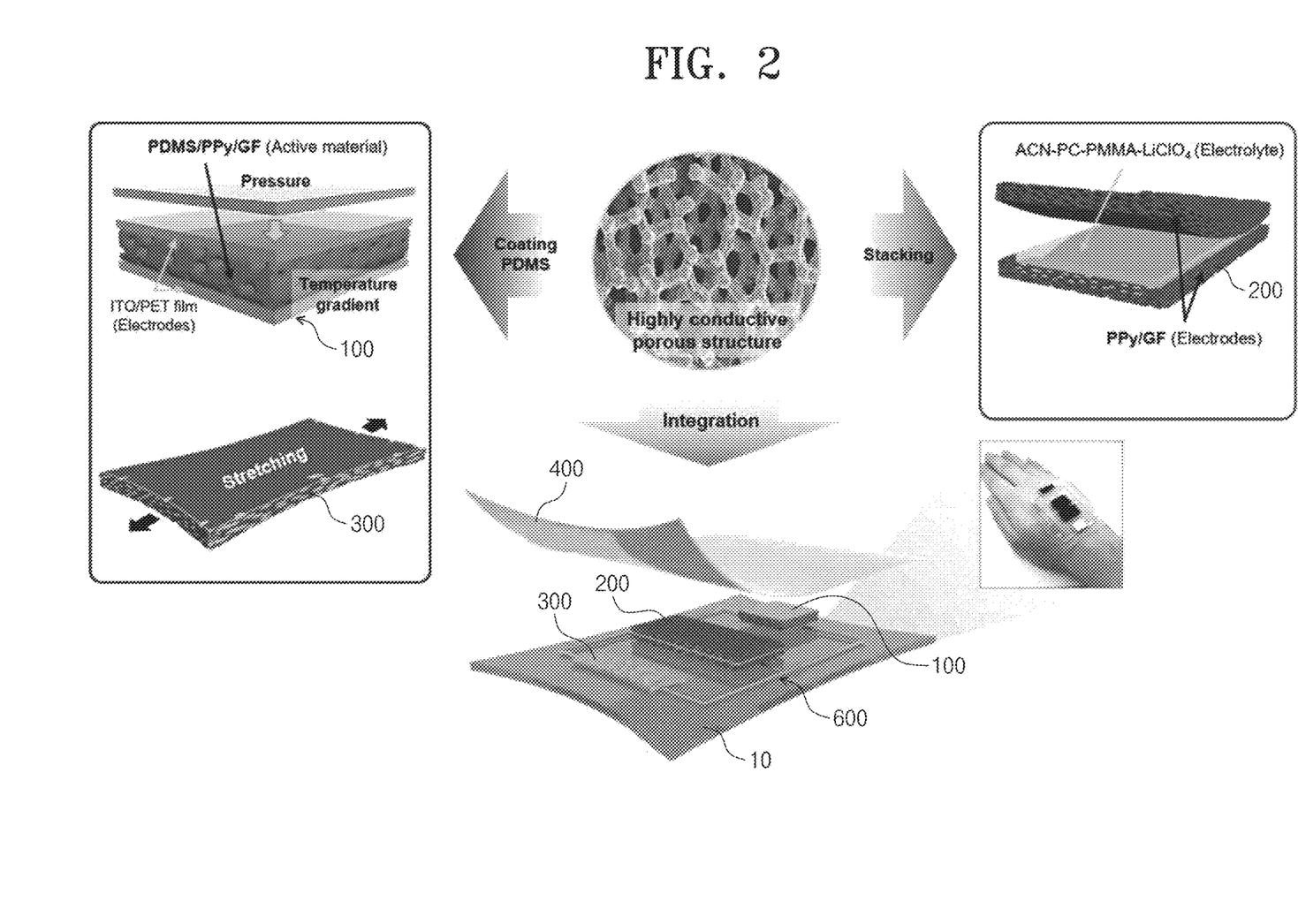
FIG. 2 is a diagram for illustrating a process of manufacturing a sensor and a supercapacitor using a graphene polypyrrole structure synthesized in FIG. 1.

FIG. 2 is a diagram for illustrating a process of manufacturing a sensor and a supercapacitor using a graphene polypyrrole structure synthesized in FIG. 1.

With reference to FIG. 2, the graphene polypyrrole structure synthesized in FIG. 1 having a high Young's modulus due to a highly conductive porous structure is coated with PDMS (polydimethylsiloxane) having an elasticity in order to compensate for easily breaking property of the synthesized graphene polypyrrole structure when force is applied. This allows a multi-sensor 100 that may measure a temperature/pressure and a strain sensor 300 to be produced. In this connection, the PDMS may be diluted and used. In particular, the reason for using the diluted PDMS in the strain sensor is that the PDMS that is not diluted may withstand external forces due to a pressure, but may not withstand strains pulled on both sides and is easily destroyed.

Specifically, Ethyl acetate, PDMS base, and PDMS curing agent were mixed at a weight ratio of 100:10:1 to form a mixture, then the graphene polypyrrole structure manufactured in FIG. 1 was sufficiently immersed in the mixture, and coated with the PDMS. Thereafter, the graphene polypyrrole structure coated with the PDMS was put in an oven at a temperature of 60 to 70° C. (preferably at 65° C.) for about 2 hours for curing the PDMS. Thereafter, each of PET/ITO films was brought in touch with each of top and bottom faces of the graphene polypyrrole structure coated with the PDMS, then fixed via silver paste.

The graphene polypyrrole structure synthesized in FIG. 1 requires applying electrolyte to use as a supercapacitor electrode. The electrolyte is composed of four materials, Acetonitrile, Propylene Carbonate, Poly(Methyl Methacrylate), and $LiClO_4$ mixed at a mass ratio of 70:20:7:3. Then, the electrolyte was heated at 60 to 80° C. (preferably at 70° C.) for about 12 hours. Thereafter, the electrolyte was sufficiently coated on the synthesized graphene polypyrrole structure, and placed in a vacuum desiccator for about 30 minutes so that the electrolyte may permeate well. After repeating this process about 5 times, the electrolyte-permeated graphene polypyrrole structures were stacked in contact with the electrolyte so that a supercapacitor 200 was manufactured.

Figure 3:
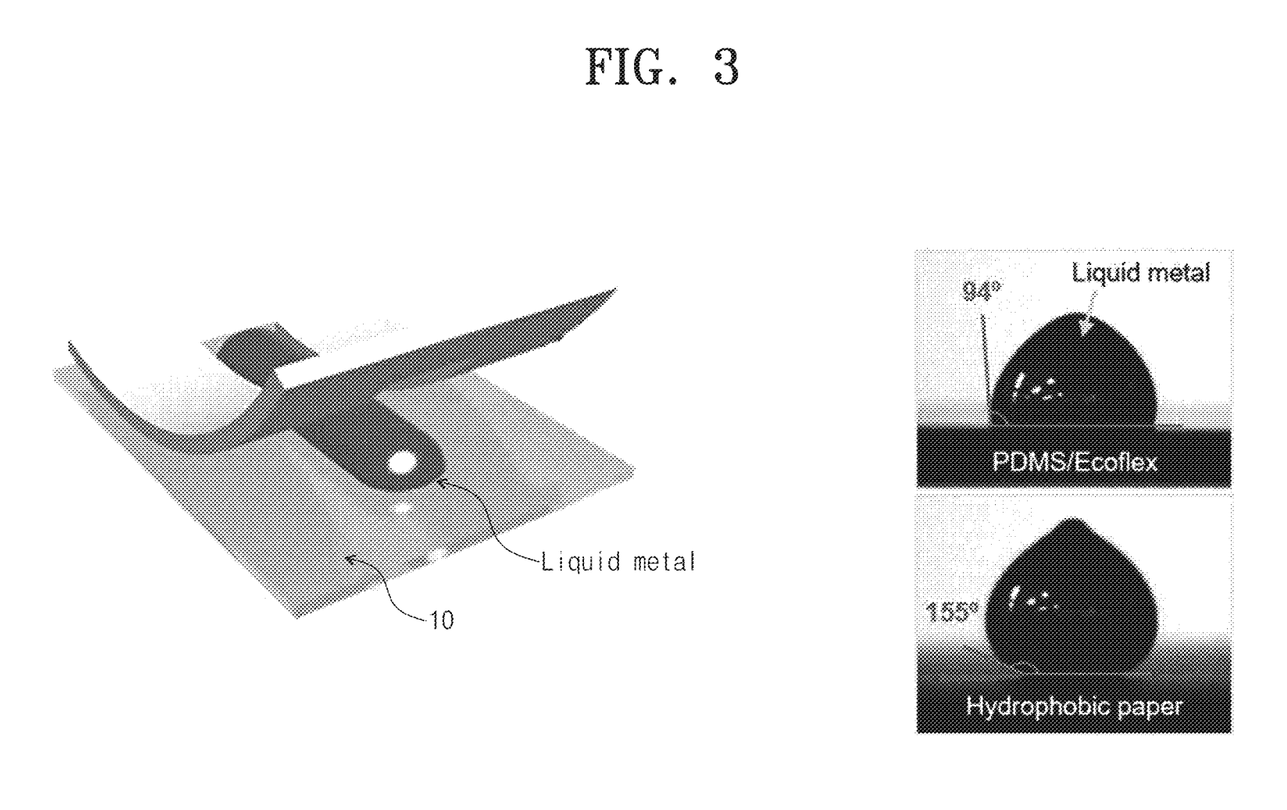
FIG. 3 is a diagram for illustrating that a hydrophobic paper is patterned, and then used as a mask for patterning a liquid metal.

FIG. 3 is a diagram for illustrating that a hydrophobic paper is patterned, and then used as a mask for patterning a liquid metal.

A connection line is required to connect and drive the multi-sensor 100, the strain sensor 300, and the supercapacitor 200 manufactured in FIG. 2. In the inventive concept, a hydrophobic paper was used for patterning the liquid metal into a desired shape.

First, a deformable flexible substrate 10 that may stretch easily was prepared by mixing the PDMS and Ecoflex.

Thereafter, as shown in FIG. 3, a portion of the flexible substrate 10 is cut off using the hydrophobic paper as a mask. The hydrophobic paper was placed on the flexible substrate 10 on which the desired pattern is formed so that the liquid metal may be inserted into the cut portion. Then, the liquid metal was poured therein, and the hydrophobic paper was removed. In this connection, the liquid metal remains only in the flexible substrate 10 because the liquid metal has greater adhesion to the flexible substrate 10.

Figure 4:
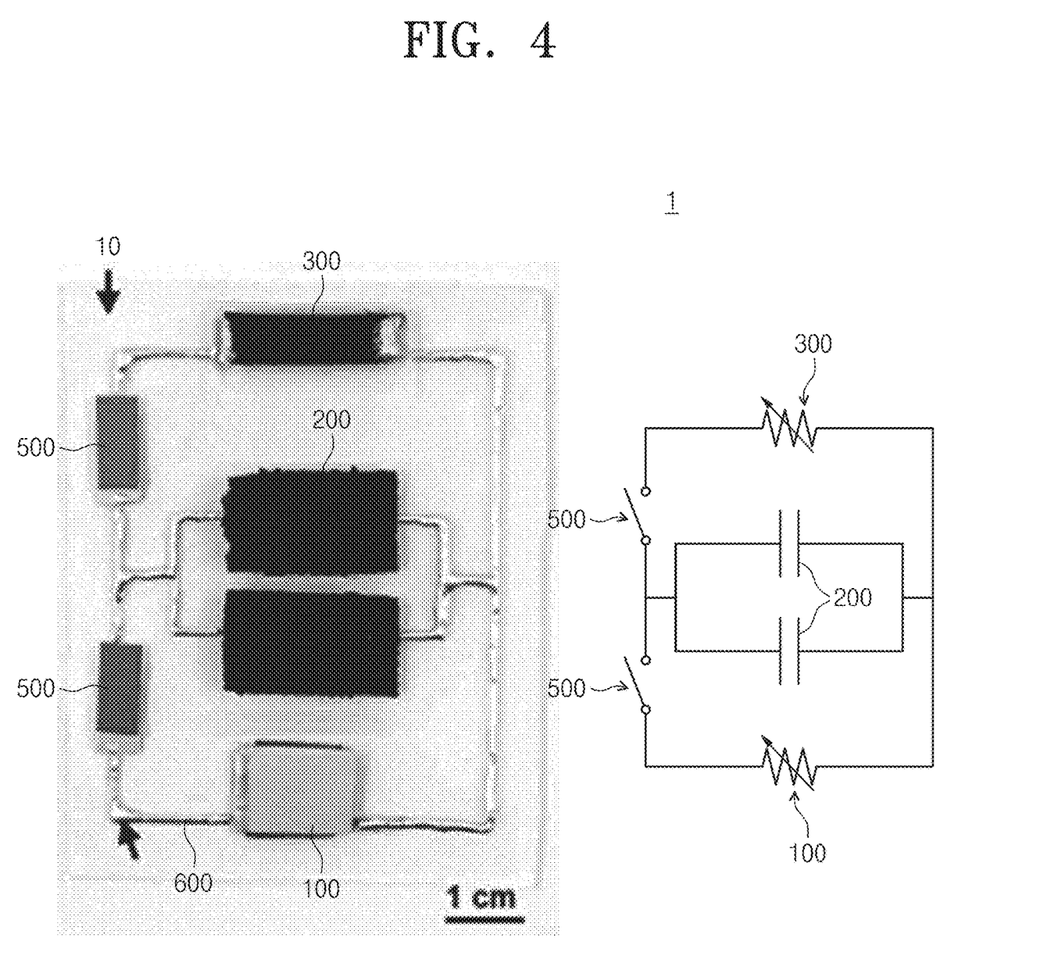
FIG. 4 is a diagram for illustrating an integration of sensors and supercapacitors on a flexible substrate through a liquid metal.

FIG. 4 is a diagram for illustrating an integration of sensors and supercapacitors on the flexible substrate 10 through a liquid metal. With reference to an integration arrow in FIG. 2, and FIG. 4, the multi-sensor 100, the strain sensor 300, and the supercapacitors 200 were connected to each other on the flexible substrate 10 through the liquid metal patterning. In one example, the supercapacitors 200 were connected in parallel, and the multi-sensor 100 and the strain sensor 300 may be connected to the supercapacitors 200 through the liquid metal patterning 600 via switches 500 respectively, as shown in FIG. 4. In this connection, the liquid metal patterning may be performed in the same manner as described with reference to FIG. 3, or may be performed using a protective film 400 such as the hydrophobic paper as a mask.

Figure 5:
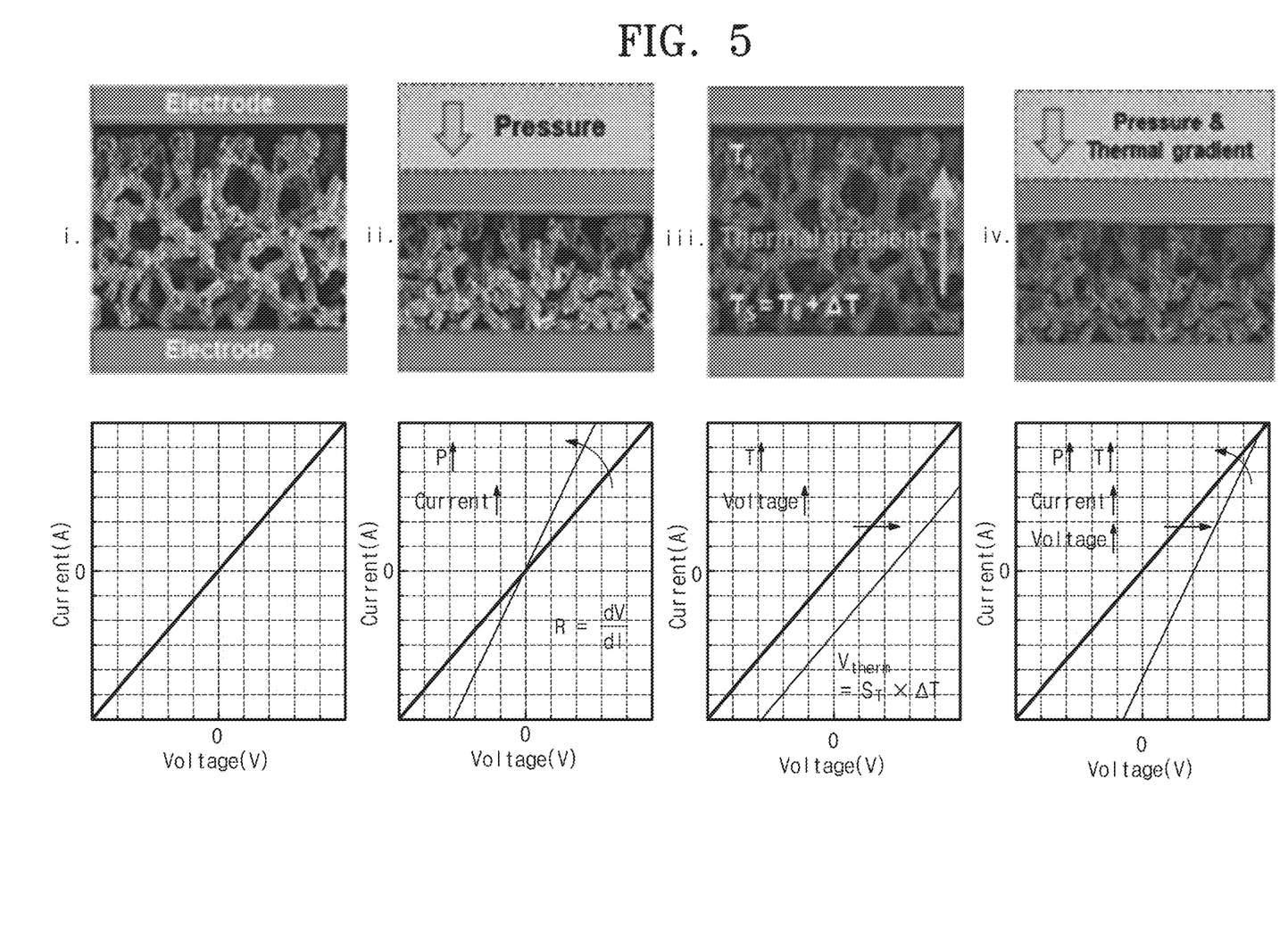
FIG. 5 is a graph for illustrating pressure and temperature measurement mechanisms of a multi-sensor.

FIG. 5 is a graph for illustrating pressure and temperature measurement mechanisms of a multi-sensor. With reference to FIG. 5, when a pressure is applied as shown in ii, an amount of a current between a top and bottom of the structure changes. Thus, a change in the pressure may be measured by measuring a resistance value corresponding to a slope of a graph in ii.

In addition, when, as shown in iii, a difference between temperatures of the top and bottom of the structure occurs, a voltage is generated due to a generation of an electromotive force resulting from a thermoelectric effect (Seebeck effect). The temperature difference may be measured by measuring the generated voltage.

Figure 6:
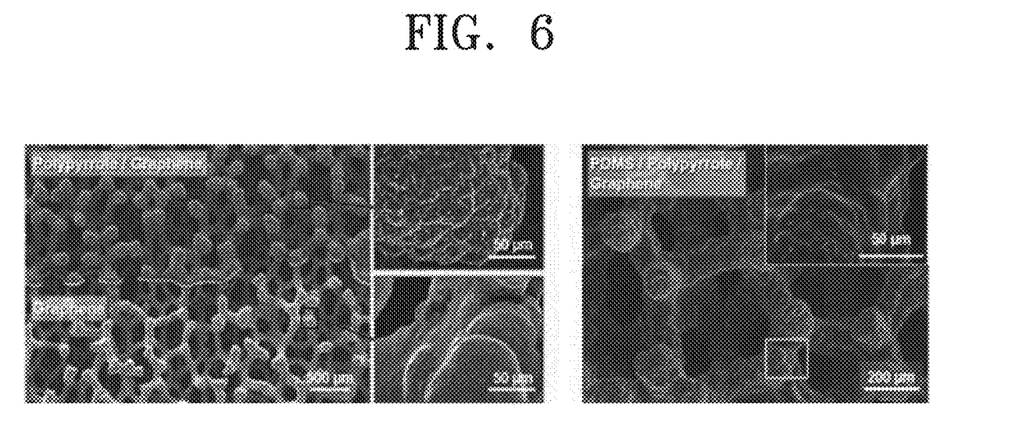
FIG. 6 shows a state after PDMS is coated on a synthesized graphene polypyrrole structure.

FIG. 6 shows a state after PDMS is coated on a synthesized graphene polypyrrole structure. When using the diluted PDMS, the PDMS may be coated only on a surface of the porous structure and may not fill the empty space thereof. When using a general PDMS, not only the structure may be coated with the PDMS but also an empty space is filled with the PDMS.

Figure 7:
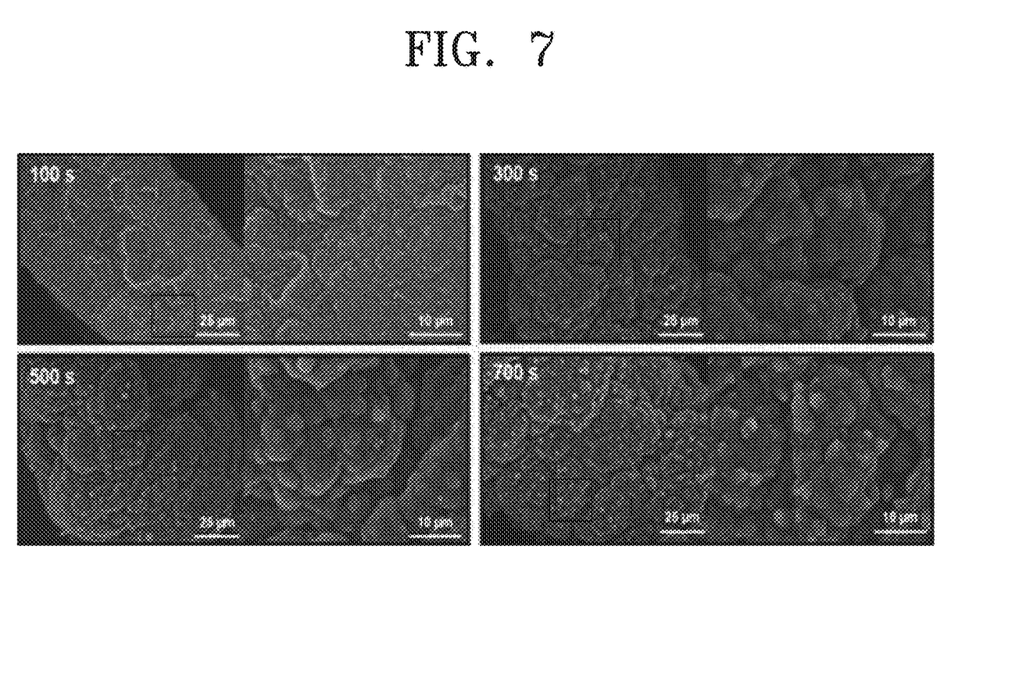
FIG. 7 shows a surface of a synthesized graphene polypyrrole structure based on polypyrrole synthesis time.
Figure 8:
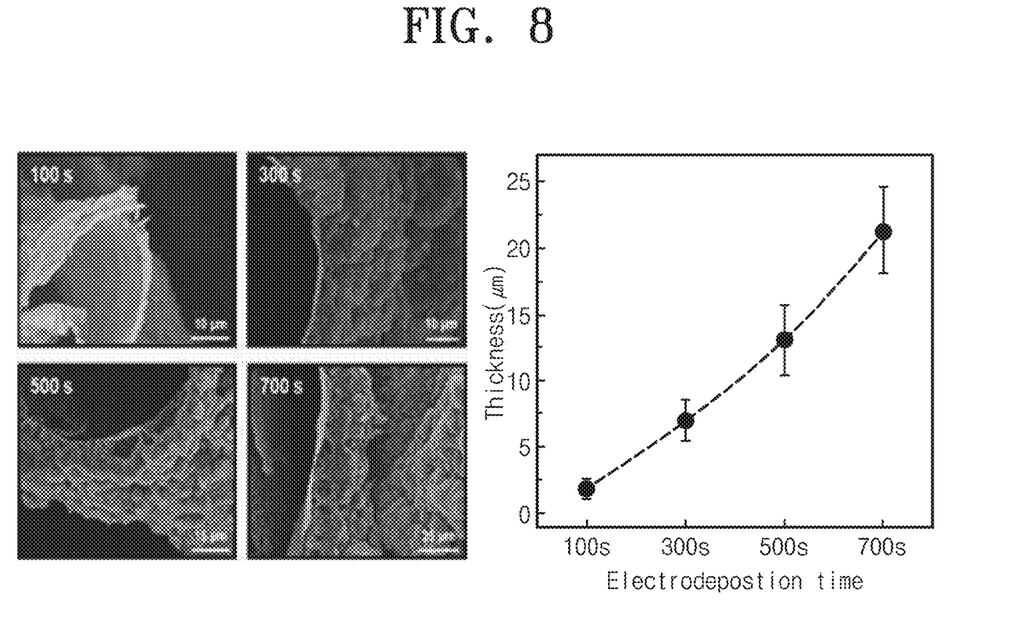
FIG. 8 is a diagram illustrating a thickness of a synthesized graphene polypyrrole structure based on polypyrrole synthesis time.

FIG. 7 shows a surface of a synthesized graphene polypyrrole structure based on polypyrrole synthesis time. FIG. 8 is a diagram illustrating a thickness of a synthesized graphene polypyrrole structure based on a polypyrrole synthesis time.

Figure 9:
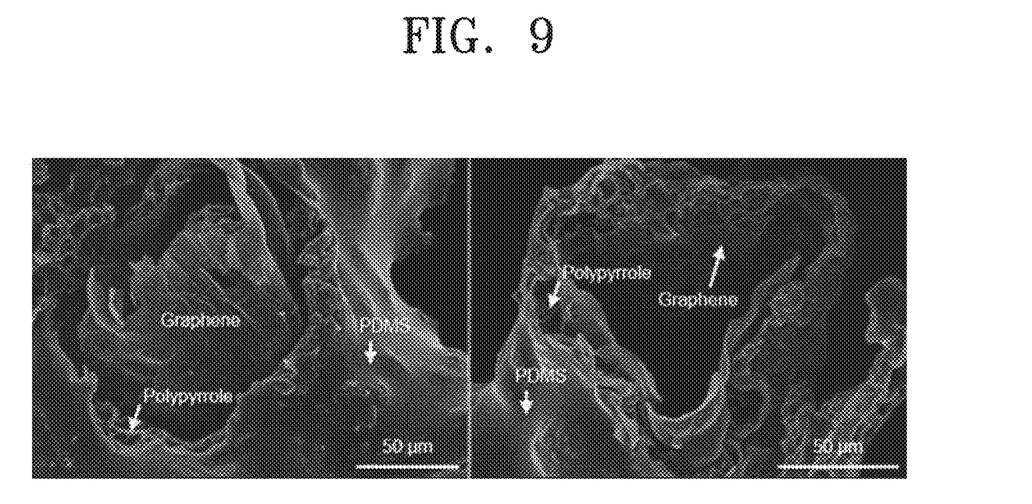
FIG. 9 shows a state after nickel is completely etched from a graphene polypyrrole structure.

Further, FIG. 9 shows a state after nickel is completely etched from a graphene polypyrrole structure. When the nickel has not been completely etched, the structure becomes rigid. Thus, the multi-sensor or the strain sensor may not be manufactured. This is because, when the pressure or the strain is applied to the structure, the structure may not be changed structurally such that characteristics of the sensor may not be achieved. Thus, the nickel is completely etched so that while the porous structure may be maintained, the changes in the pressure and the strain may be achieved.

Figure 10:
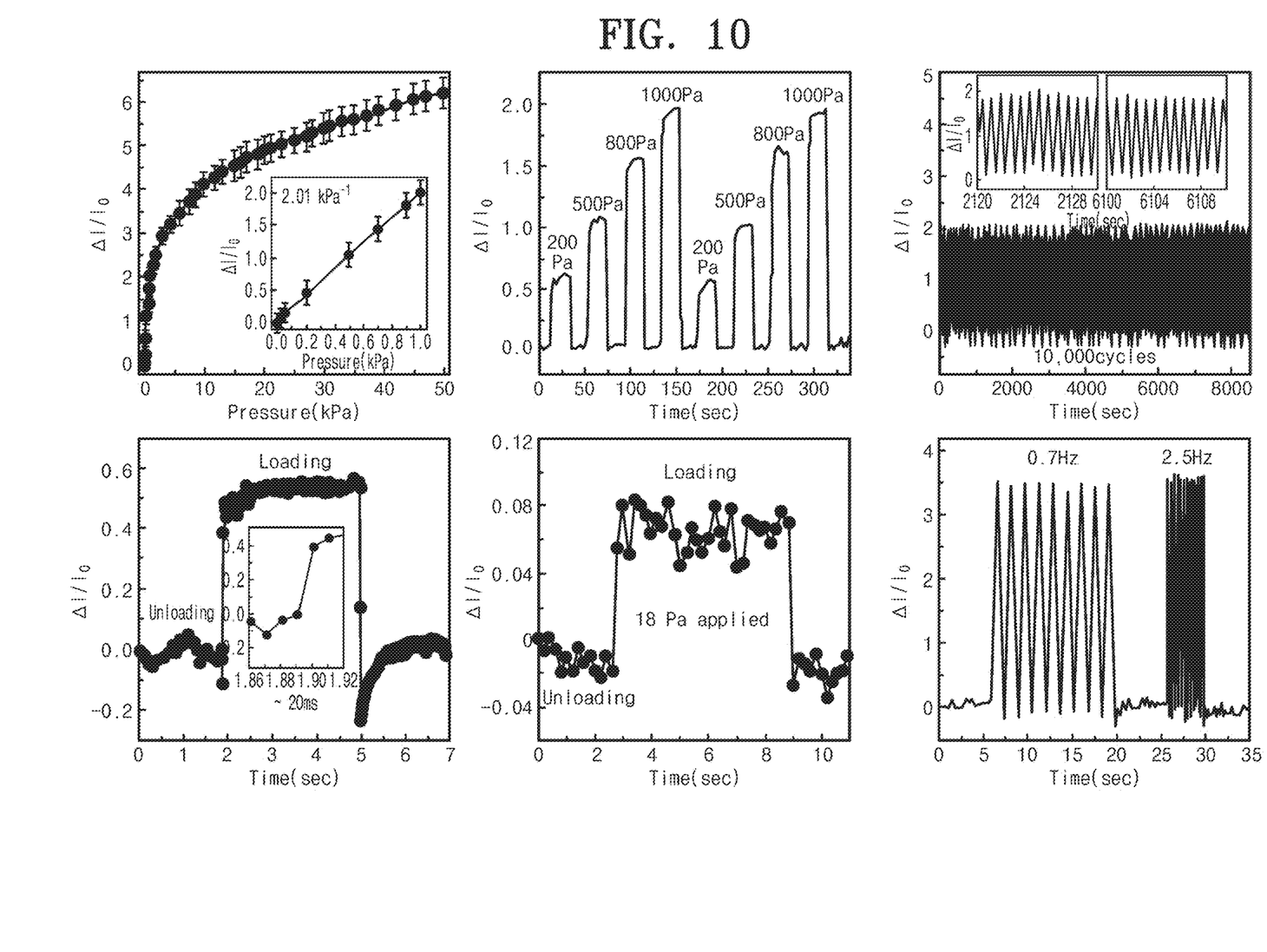
FIG. 10 is a diagram illustrating a pressure performance of a multi-sensor manufactured according to the inventive concept.

FIG. 10 is a diagram illustrating a pressure performance of a multi-sensor manufactured according to the inventive concept. With reference to FIG. 10, it shows that the structure may function as a pressure sensor by confirming a pressure and a current change based on time. In addition, it also shows that the same pressure may be measured even at about 10,000th cycle, indicating that it is durable.

According to the inventive concept, the pressure sensor may be capable of detecting about 20 Pa, and exhibiting a fast response speed, and the like, thereby having high performance and stable pressure property.

Figure 11:
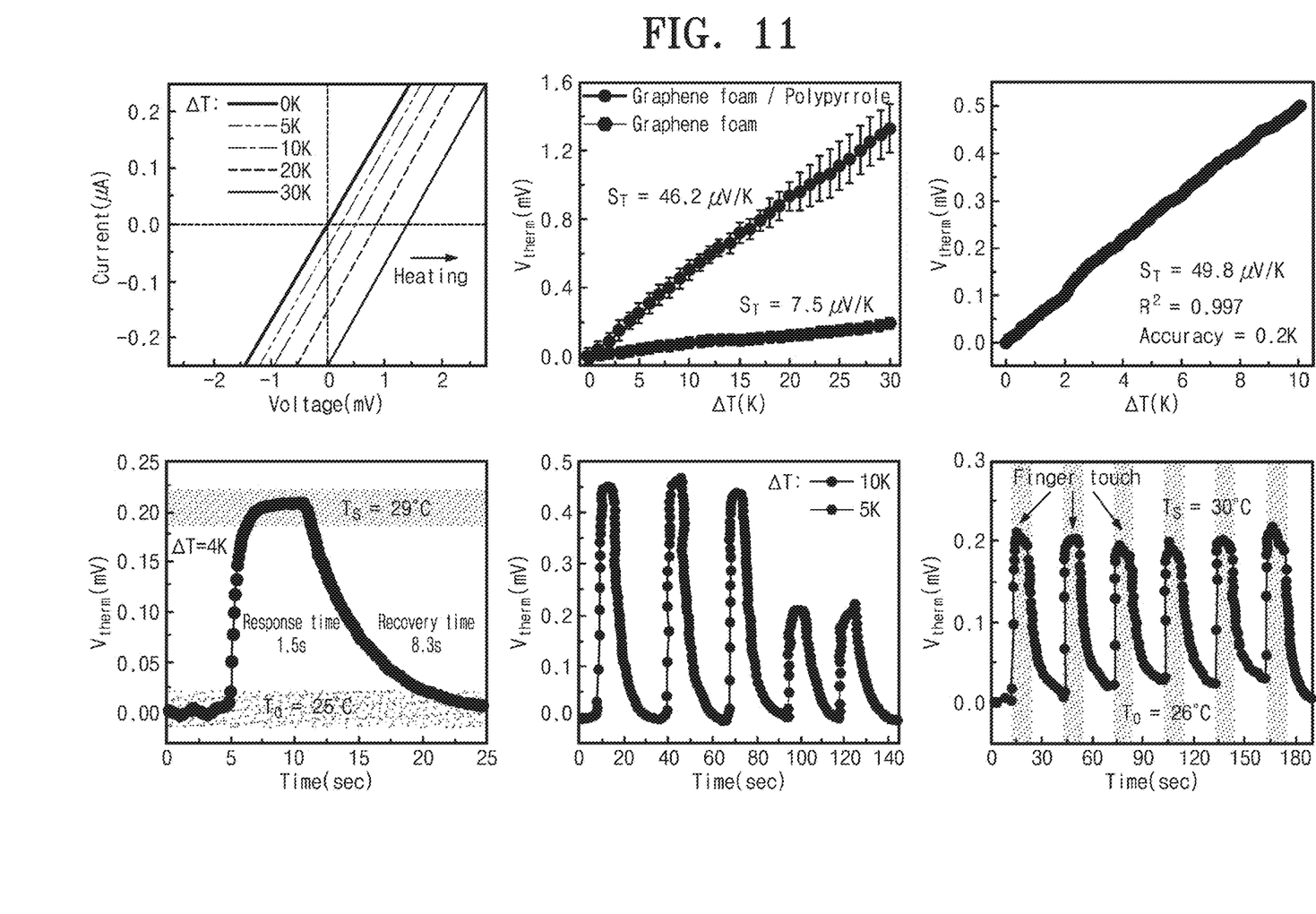
FIG. 11 shows a temperature performance of a multi-sensor manufactured according to the inventive concept.

FIG. 11 shows a temperature performance of a multi-sensor manufactured according to the inventive concept. With reference to FIG. 11, the graphene polypyrrole structure of the inventive concept may measure a voltage change depending on the temperature change well compared to the graphene structure. Further, the graphene polypyrrole structure of the inventive concept also has an excellent response speed of about 1.5 seconds, and may also measure a change in body temperature depending on a finger touch well.

Figure 12:
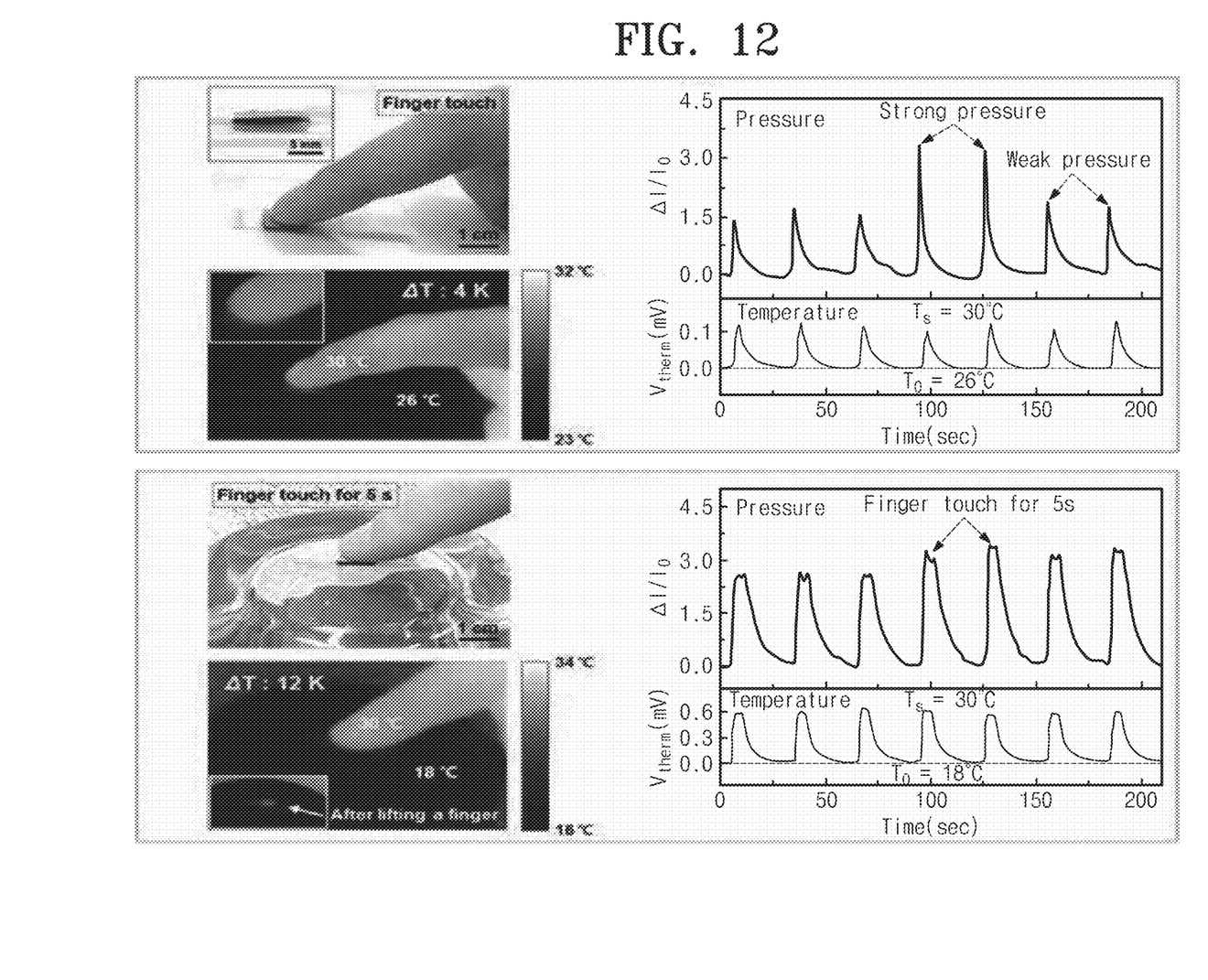
FIG. 12 is a diagram for illustrating that a multi-sensor manufactured according to the inventive concept may be driven by itself.

FIG. 12 is a diagram for illustrating that a multi-sensor manufactured according to the inventive concept may be driven by itself. With reference to FIG. 12, it may be seen from a graph based on a temperature change that there is a current change depending on a pressure of the finger contact, and there is no interference of the temperature and the pressure.

Figure 13:
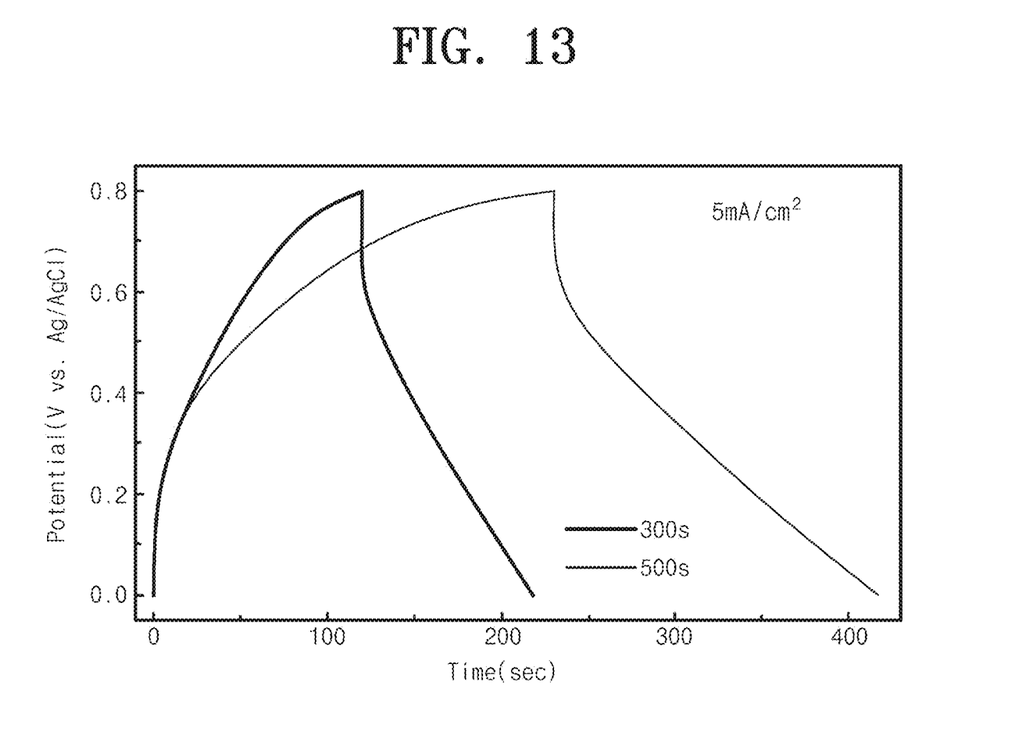
FIG. 13 is a graph illustrating a capacitance difference of a supercapacitor manufactured according to the inventive concept based on a polypyrrole growth time.

FIG. 13 is a graph illustrating a capacitance difference of a supercapacitor manufactured according to the inventive concept based on a polypyrrole growth time. It may be confirmed that, when comparing between charging and discharging times of polypyrroles, a supercapacitor made of polypyrrole grown for 500 seconds has larger charging and discharging times than a supercapacitor made of polypyrrole grown for 300 seconds. This means that the supercapacitor made of the polypyrrole grown for 500 seconds has a larger capacitance.

The foregoing detailed description illustrates the inventive concept. The foregoing is also illustrative of the preferred embodiments of the inventive concept, and the inventive concept may be used in various other combinations, modifications and environments. That is, the scope and the description of the inventive concept disclosed in this specification may be changed or modified within the scope of equivalents and/or the skill or knowledge of the inventive concept. The embodiments described above are intended to explain certain best modes for implementing the technical idea of the inventive concept. Various modifications required for the specific application and usage of the inventive concept are possible. Therefore, the detailed description of the inventive concept is not intended to limit the inventive concept to the disclosed embodiments. It is also to be understood that the appended claims are intended to cover further embodiments.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A sensor based on a graphene polypyrrole 3-dimensional (3D) porous structure, the sensor comprising: the graphene polypyrrole 3D porous structure, wherein the graphene polypyrrole 3D porous structure is prepared by growing graphene on a nickel 3D porous structure, growing polypyrrole on a graphene-grown nickel 3D porous structure, and then coating polydimethylsiloxane (PDMS) on a graphene polypyrrole grown structure; and electrodes respectively disposed on top and bottom faces of the graphene polypyrrole 3D porous structure, wherein each of the electrodes includes a polyethylene terephthalate (PET) indium tin oxide (ITO) film, wherein silver paste layers are interposed between each PET ITO film and each of the top and bottom faces of the graphene polypyrrole 3D structure.

2. The sensor of claim 1, wherein the coating of the PDMS includes mixing ethyl acetate, PDMS base, and PDMS curing agent at a weight ratio of 100:10:1 to form a mixture, and immersing the graphene polypyrrole grown structure in the mixture.

3. The sensor of claim 1, wherein a PDMS-coated graphene polypyrrole grown structure is washed with deionized (DI) water, is immersed in $FeCl_3$ solution and is heated to remove nickel from the PDMS-coated graphene polypyrrole grown structure.

4. The sensor of claim 1, wherein the growing of the graphene on the nickel 3D porous structure includes chemical vapor depositing (CVD) the graphene on the nickel 3D porous structure while a thickness of the deposited graphene is controlled via an adjustment of a predetermined methane gas injection time.

5. A supercapacitor based on a graphene polypyrrole 3-dimensional (3D) porous structure, the supercapacitor comprising:

first and second graphene polypyrrole 3D porous structures, wherein each of the first and second graphene polypyrrole 3D porous structures is prepared by growing graphene on a nickel 3D porous structure, growing polypyrrole on a graphene-grown nickel 3D porous structure, and then coating polydimethylsiloxane (PDMS) on a graphene polypyrrole grown structure; and first and second electrolytes respectively applied on single faces of the first and second graphene polypyrrole 3D porous structures, wherein the first and second graphene polypyrrole 3D porous structures are arranged such that the first and second electrolytes contact each other.

6. The supercapacitor of claim 5, wherein each of the electrolytes is prepared by mixing acetonitrile, propylene carbonate, poly methyl methacrylate, and $LiClO_4$ at a mass ratio of 70:20:7:3.

7. An integrated device comprising:

a sensor comprising a graphene polypyrrole 3-dimensional (3D) porous structure and electrodes respectively disposed on top and bottom faces of the graphene polypyrrole 3D porous structure;

a supercapacitor comprising two graphene polypyrrole 3D porous structures, and two electrolytes respectively applied on single faces of the two graphene polypyrrole 3D porous structures; and a liquid metal for electrically connecting the sensor and the supercapacitor with each other, wherein at least one of the graphene polypyrrole 3D porous structure and the graphene polypyrrole 3D porous structures is prepared by growing graphene on a nickel 3D porous structure, growing polypyrrole on a graphene-grown nickel 3D porous structure, and then coating polydimethylsiloxane (PDMS) on a graphene polypyrrole grown structure.

8. The integrated device of claim 7, wherein the sensor includes at least two sensors based on the graphene polypyrrole 3D porous structure, and wherein at least one of the at least two sensors is configured as a pressure sensor for measuring a pressure, and at least another sensor of the at least two sensors is configured as a temperature sensor for measuring a temperature.

9. The integrated device of claim 7, wherein the liquid metal electrically connects the sensor and the supercapacitor via a liquid metal patterning using a mask including a hydrophobic paper.

* * * * *